United States Patent [19]

Nowak et al.

[11] Patent Number: 5,762,345

[45] Date of Patent: Jun. 9, 1998

[54] FORCE-TRANSMISSION MECHANISM USING FLATTED BARREL ELEMENTS

[75] Inventors: Florian L. Nowak; Gary F. Nowak, both of Newington; Jay P. Giblin, Cheshire, all of Conn.

[73] Assignee: Nowak Products, Inc., Newington, Conn.

[21] Appl. No.: 731,783

[22] Filed: Oct. 18, 1996

[51] Int. Cl.[6] ........................ B23B 31/26
[52] U.S. Cl. ............... 279/146; 74/110; 279/50
[58] Field of Search ................ 279/50, 51, 57, 279/58, 146; 74/110

[56] References Cited

U.S. PATENT DOCUMENTS

| 4,049,282 | 9/1977 | Yearsley | 279/50 |
|---|---|---|---|
| 4,418,925 | 12/1983 | Nowak | 279/50 |
| 4,509,765 | 4/1985 | Nowak | 279/50 |
| 4,995,625 | 2/1991 | Nowak | 279/50 |
| 5,269,543 | 12/1993 | Nowak et al. | 279/50 |

Primary Examiner—Steven C. Bishop
Attorney, Agent, or Firm—Ira S. Dorman

[57] ABSTRACT

A collet-operating mechanism utilizes an array of wedge members for the transmission of closing force to the pressure collar. The wedge members are of flatted barrel-shaped configuration to optimally cooperate, in line contact relationships, with bearing surfaces on the pressure collar and the supporting sleeve member.

11 Claims, 5 Drawing Sheets

FORCE-TRANSMISSION MECHANISM USING FLATTED BARREL ELEMENTS

BACKGROUND OF THE INVENTION

The collet used to secure the work in an automatic bar machine, screw machine, or the like, is normally closed by shifting an outer spindle over an enlarged forward end portion of the collet. The means for shifting the outer spindle is generally referred to as the "collet closing mechanism," and for many years the most widely used mechanisms of this sort comprised an arrangement of chuck levers mounted in a chuck lever fulcrum. So-called "ball-chucker" systems have also been provided in which a circular array of ball bearings, held within a bronze cage behind a slidably mounted thrust collar, are forced by an outer, slidably mounted sleeve into a circumferential channel defined behind the collar, so as to shift it forwardly. The cages employed in such systems are however subject to permanent deformation and wear, causing the bearings to stick and prevent actuation (or at least to impede smooth operation), in addition to being complex and expensive to produce.

Barrel-shaped bearings have been employed in an effort to increase line contact, and to thereby to reduce deformation and wear. Not only has success in achieving those objectives been limited, but moreover, the need for added precision in machining the barrel-retaining cages (so as to maintain a coplanar relationship among the centerlines of the bearing array) has added substantially to the difficulty and cost of manufacture. More recently, a highly effective and durable collet closing mechanism has been provided in which a circular array of wedges provide force-transmitting elements. Such a mechanism, and improvements thereto, are described and claimed in Nowak and Nowak et al U.S. Pat. Nos. 4,418,925, issued Dec. 6, 1983, No. 4,509,765, issued Apr. 9, 1985, No. 4,995,625, issued Feb. 26, 1991 and No. 5,269,543, issued Dec. 14, 1993. Despite the attributes of the mechanisms of these patents, it would of course be beneficial to realize further improvements in effectiveness, operation, durability; and cost and facility of manufacture.

SUMMARY OF THE DISCLOSURE

Accordingly, it is the broad object of the present invention to provide a novel wedge-operated force-transmission mechanism, especially suitable for use as a collet-closing mechanism, in which the effectiveness of force transmission, ease of operation, durability, and facility and economy of manufacture may all be increased.

A more specific object of the invention is to provide such a mechanism in which the coacting, force-generating elements are so configured as to afford the improvements sought.

It has now been found that the foregoing and related objects of the present invention are readily attained in a mechanism comprising, in combination: a supporting member having a longitudinal axis; a flange portion extending circumferentially about the supporting member, coaxially with the longitudinal axis and fixed thereon against axial movement in at least a rearward direction, the flange portion providing a generally annular forward-facing bearing surface; a pressure collar slidably mounted for limited axial movement on the supporting member and having a generally annular bearing surface disposed coaxially with the longitudinal axis in confronting relationship to the flange portion bearing surface, so as to cooperatively define therebetween an inwardly tapered circumferential channel; a multiplicity of substantially identical wedge members disposed in a circular array about the supporting member for radial movement within the channel and conforming generally thereto; and an operating member slidably mounted for axial movement relative to the supporting member and having a sidewall portion extending over the wedge members and defining a compound circular recess therewithin, the compound recess being comprised of a relatively large radius forward section, a relatively small radius rearward section, and a transition section therebetween. The wedge members are of generally flatted barrel-shaped form, and have their axes disposed substantially perpendicular to the longitudinal axis of the supporting member; they are of circular cross-sectional configuration, taken in transaxial planes to which their central axes are normal, and they have a substantially convex cross-sectional configuration taken in axial planes in which the central axes lie. The wedge members deviate from true convex form by having a cylindrical central portion that merges smoothly into end portions that taper therefrom in opposite directions; the central portion provides rectilinear line contact elements (in the axial planes referred to), which lie between the arcuate line contact elements that are provided by the end portions of the wedge member. The operating member is movable between a rearward, open position, in which the forward section of its recess is disposed over the circumferential channel, and a forward, closed position in which the rearward section is disposed over the channel. The relatively large dimensions of the forward section of the recess permit the wedge members to assume radially outward positions within the channel, with the operating member in its open position, and the relatively small dimensions of the rearward section force the wedge members to radially inward positions with the operating member in its closed position. The wedge members are dimensioned to act upon the, bearing surfaces of the flange portion and the pressure collar so as to shift the latter forwardly, in the closed position of the operating member, and thereby to effect operation of the mechanism.

In preferred embodiments, the opposite ends of each of the wedge members will be curved in the axial planes, to provide blunt circumferential edges thereabout. The central portion of each wedge member will usually constitute about 15 to 30 percent of its length, and the arcuate line contact elements will be formed at a radius that is at least substantially equal (and most desirably, precisely so) to the radius of the relatively small radius rearward section of the operating member recess; each wedge member will normally be integrally formed from a single piece of hardened steel.

The annular bearing surface of the pressure collar will desirably be flat, and the forward-facing bearing surface of the flange portion will desirably be of convex form; these surfaces will beneficially also be formed of hardened steel (normally by so manufacturing the corresponding part). The flange portion may advantageously be comprised of a backup flange, integrally formed on the supporting member, and a separate wear ring assembled therewith and providing the annular bearing surface. The transition section of the compound recess in the operating member sidewall portion will desirably be of convexly arcuate cross section, taken in longitudinally extending planes. In the best mode presently contemplated, the invention will be embodied as a collet-operation mechanism.

BRIEF DESCRIPTION OF THE DRAWINGS

FIG. 2 is a sectional view showing a prior art collet-operating mechanism into which the features embodying the

Figure 2:
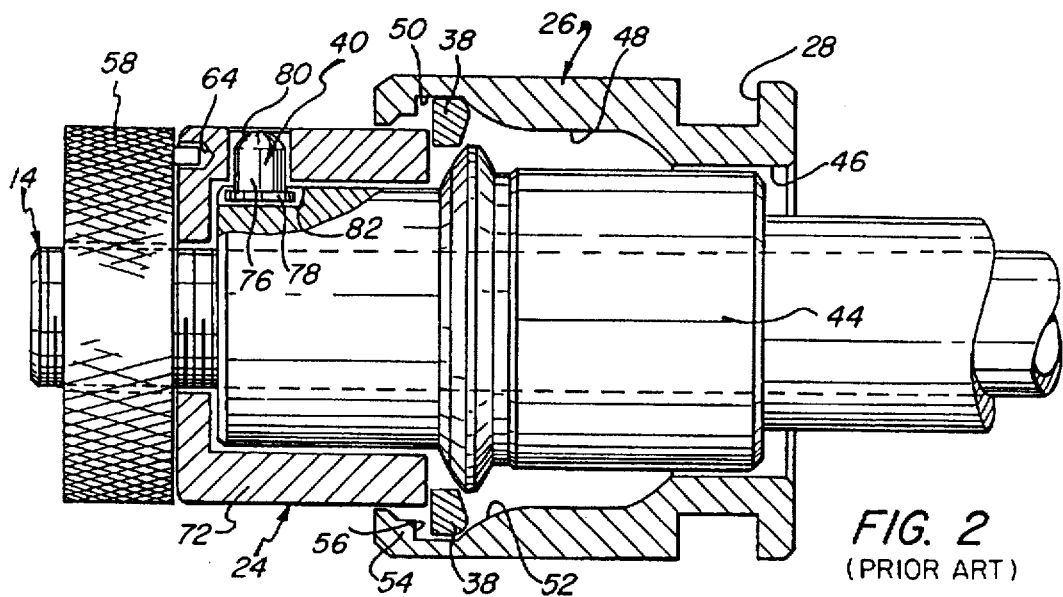
Figure 3:
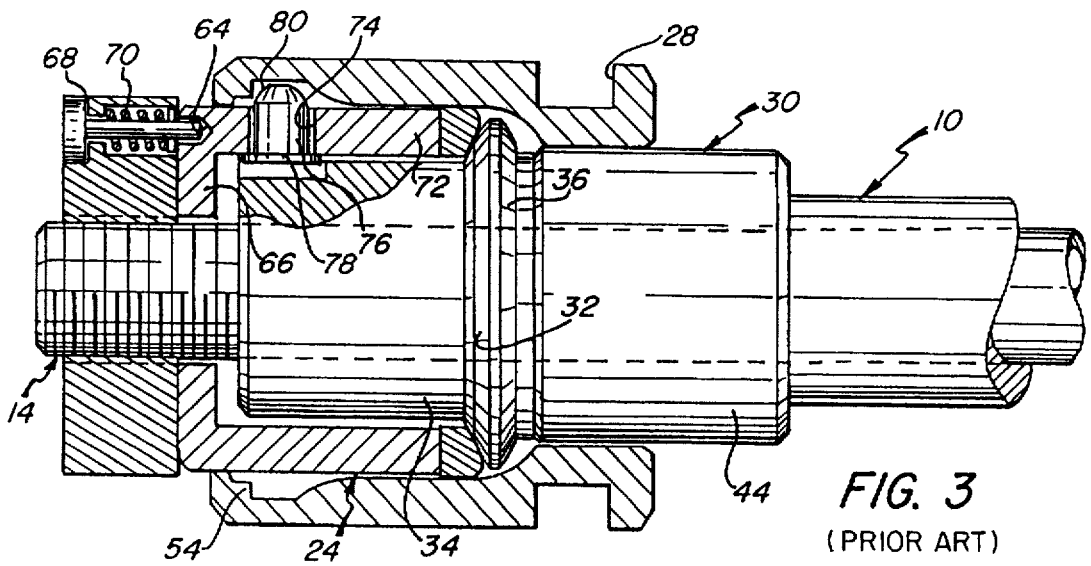
Figure 4:
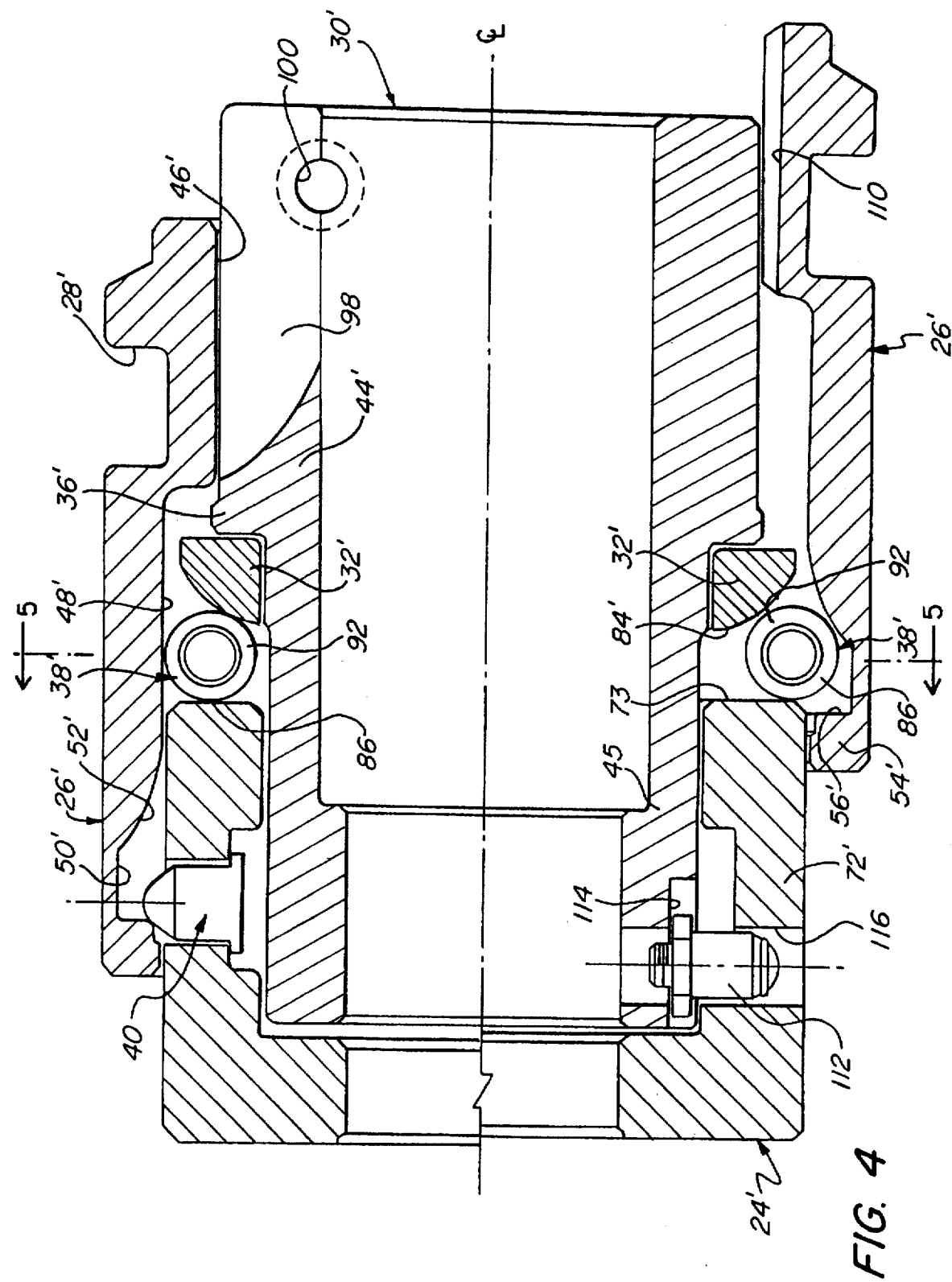
Figure 5:
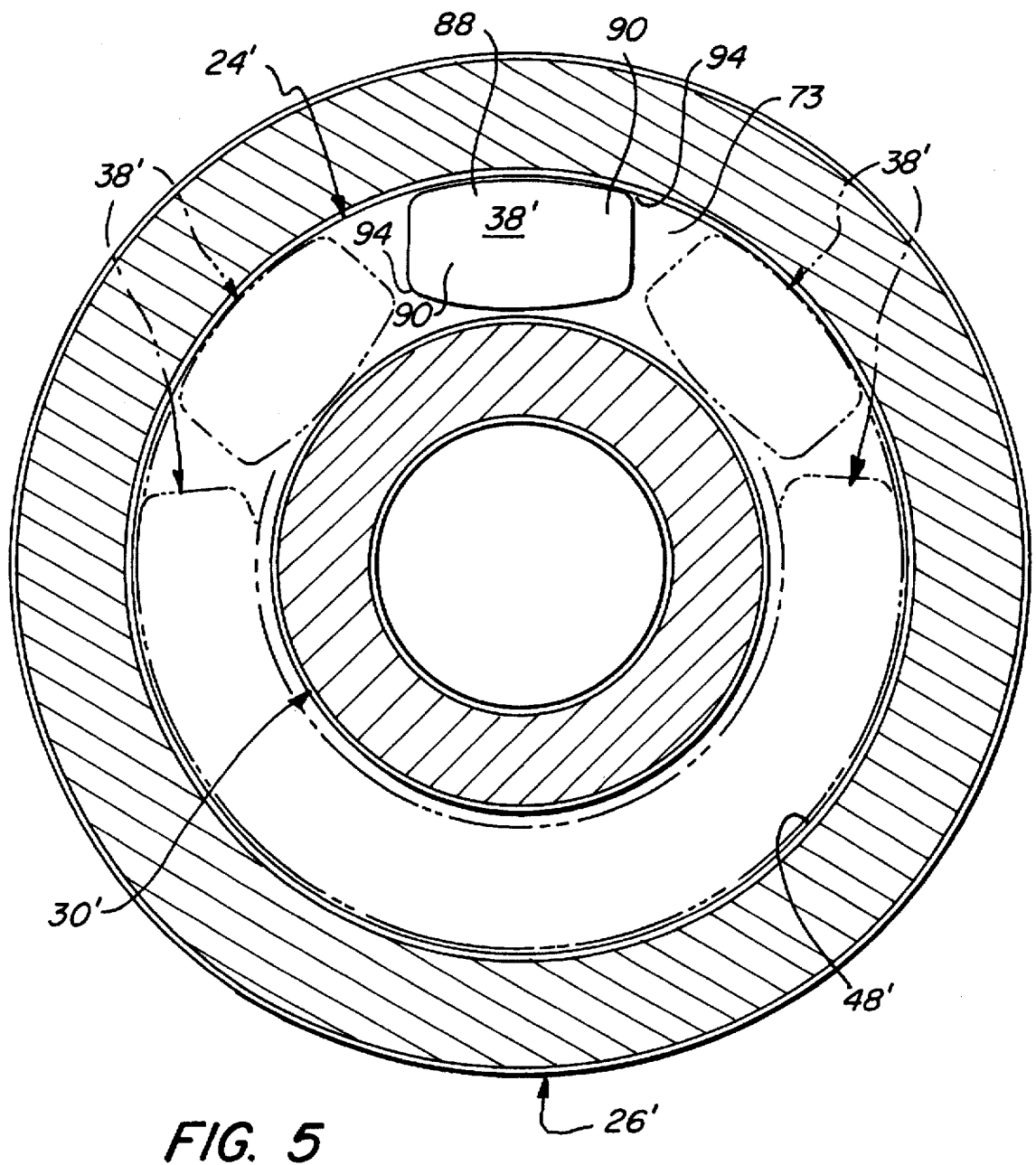
Figure 6:
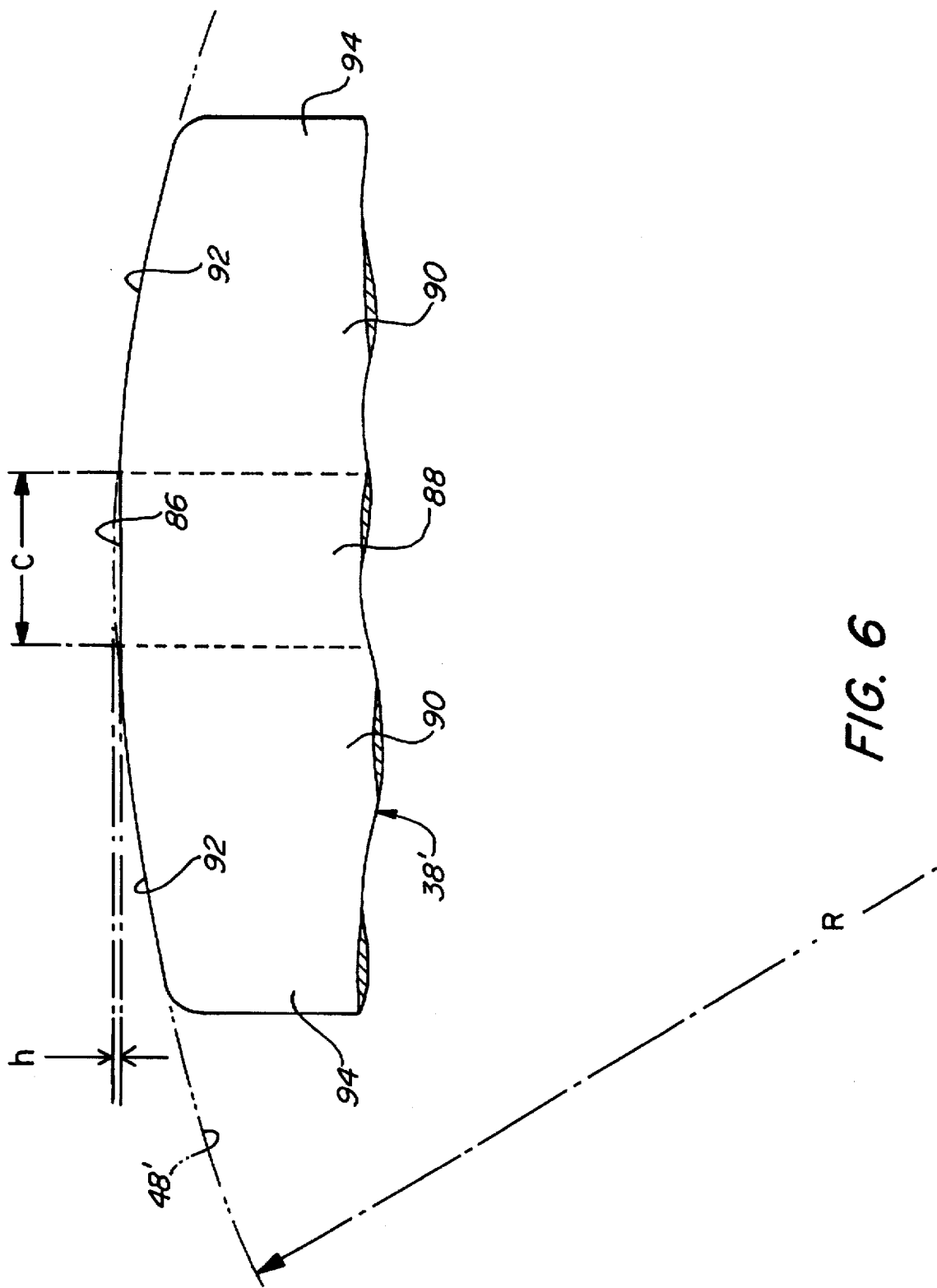

3 invention may be substituted, the mechanism being mounted upon a rotatable machine part and in condition for permitting the operatively connected collet to assume an open position;

FIG. 3 is a view comparable to FIG. 2, showing the mechanism in condition for closing the collet;

FIG. 4 is a diagrammatic sectional view illustrating the mechanism of the invention, the portions of the Figure above and below the longitudinal centerline showing, respectively, its closed and open positions;

FIG. 5 is a sectional view, taken along line 5—5 of FIG. 4, drawn to a scale enlarged therefrom and showing, in full line, only a single complete wedge member of the array; and FIG. 6 is a fragmentary elevational view of one of the flatted barrel-shaped wedge members of which the instant mechanism is comprised, drawn to a scale further enlarged from that of FIG. 5, the Figure also showing, in phantom line, the inside surface of the operating sleeve by which the small radius section of its internal recess is defined.

DETAILED DESCRIPTION OF THE DRAWINGS AND OF THE ILLUSTRATED EMBODIMENT OF THE INVENTION

Figure 1:
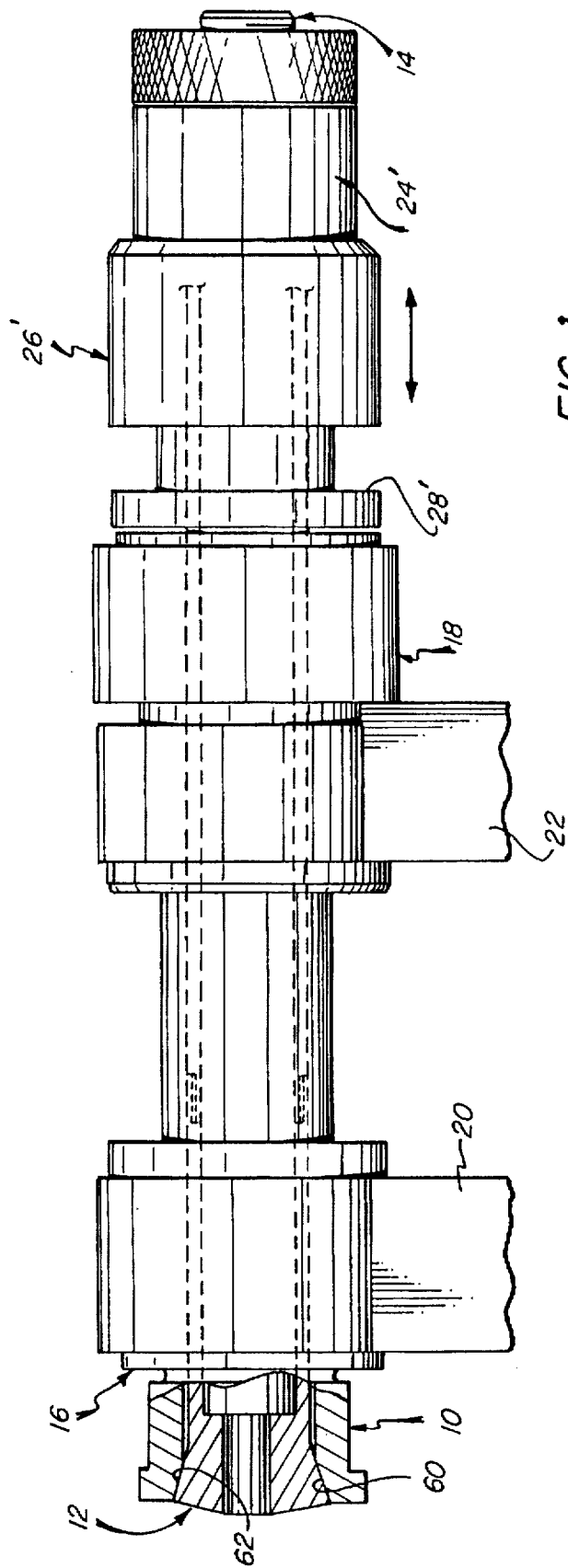
FIG. 1 is a fragmentary elevational view showing the mechanism of the invention installed in a machine and operatively connected to a collet.

Turning now in detail to the appended drawings, a spindle assembly of a kind typically employed in an automatic screw machine, and in which a collet-operating mechanism embodying the invention may suitably be installed, is shown in FIG. 1. It includes a spindle, generally designated by the numeral 10, within which is disposed a collet, generally designated by the numeral 12, and a threadably engaged, coaxial draw tube generally designated by the numeral 14. The spindle 10 is rotatably mounted in bearing assemblies, generally designated by the numerals 16 and 18, which are supported in frame portions 20 and 22, respectively.

The collet-operating mechanism includes a pressure collar, or collet-closing member, generally designated by the numeral 24', and an operating sleeve or outer housing member, generally designated by the numeral 26', slidably mounted for reciprocal movement over the pressure collar 24'. Such movement is transmitted through a machine-driven actuating shoe (not shown), having a collar part seated within the circumferential channel 28' formed into the outer housing 26'.

With more specific reference to FIGS. 2 and 3, it is seen that the mechanism includes an inner supporting sleeve, generally designated by the numeral 30, mounted upon the spindle 10, and a wear ring 32 mounted upon a reduced-diameter forward portion 34 of the sleeve 30 and abutted against a collar element 36 thereof. The mechanism also includes a set of force-transmitting wedges 38, and three, equiangularly spaced holding pins generally designated by the numeral 40, only one of which is shown.

The inside surface of the operating sleeve 26 is machined to provide a compound recess, disposed adjacent the cylindrical bearing surface 46 by which the sleeve is slidably supported upon the wall portion 44. The recess consists of a relatively small radius inner section 48, a relatively large radius outer section 50, and a flared transition section 52 therebetween; a shoulder 54 lies contiguous to the large radius section 50 at the outer end of the recess.

As will be appreciated, shifting of the operating sleeve 26 from the position shown in FIG. 2 to that of FIG. 3, so as to dispose it over the pressure collar 24, will force the wedges 38 into the tapered channel formed between the confronting bearing surfaces on the wear ring 32 and the pressure collar

4

24. This will effect a slight forward axial shifting of the pressure collar 24 (to the left in FIGS. 2 and 3), in turn shifting the nut 58 and the threadably attached draw tube 14 in the same direction. As a result, the collet 12 will be retracted into the spindle 10 (moving to the right in FIG. 1, its orientation being inverted from that of FIGS. 2 and 3), thereby causing compression of the collet elements by virtue of coaction of the mated tapered surface 60, 62 on the spindle and collet, 10, 12, respectively.

It will be noted that a ring of small sockets 64 (only one of which is shown) are formed into the angular flange portion 66 on the end of the pressure collar 24, and that the nut 58 carries a locking pin 68, which is seated within an axially extending aperture and is biased, by spring 70, toward the pressure collar 24. Turning of the nut 58 on the threaded end portion 72 of the draw tube 14 will of course change slightly the axial position of the tube relative to the collet 12, thereby enabling ready adjustment of the level of gripping force applied to the work upon actuation by the operating mechanism. The spring-biased pin 68 will of course engage within any one of the sockets 64 that is brought into alignment with it, to thereby maintain the nut 58 in any selected position; the pin 68 can of course be retracted readily for facile adjustment.

Three apertures 74 (only one of which is visible in the Figures) are formed at equiangularly spaced (i.e., 120°) locations about the cylindrical sidewall portion 72 of the pressure collar 24, in a common plane perpendicular to the axis thereof. One of the holding pins 40 is disposed in each aperture 74; because the diameter of the shaft portions 76 is slightly smaller than the diameter of the apertures, the pins can slide freely therein with minimal play, and a head portion 78 on each keeps it from disengagement in a radially outward direction. Disengagement in the opposite direction is prevented by abutment of the pins 40 against the surface of the reduced diameter portion of the inner sleeve 30, into which longitudinally extending slots 82 are formed to accommodate the head portions 78 thereof. As is more fully described in the above-mentioned Nowak patent No. 4,995, 625, centrifugal forces generated by rotation of the machine spindle will cause the tips 80 of the pins 40 to engage the collet operating member 26, to thereby maintain the collet in its closed position.

The enlarged portion 44' of the inner sleeve member 30' of the mechanism is longitudinally divided at 98, and has formed secantally therethrough aligned bore portions 100 (only one of which is seen) which receive a clamping screw for securing the sleeve member on the spindle 10. In addition, the enlarged portion 44' may be formed with a longitudinally extending radial slot for engagement of a T-shaped key to prevent rotation relative to the supporting sleeve member and to increase its flexibility, thereby facilitating assembly on the spindle and reducing the need for close manufacturing tolerances. These and other features that may be incorporated into the instant mechanism are described at lines 27 through 51 in column 5 of U.S. Pat. No. 5,269,543.

Turning now in greater detail to FIGS. 4 through 6 of the drawings, therein illustrated is a mechanism embodying the present invention, and certain components thereof. Features that are common to the several Figures are designated by the same numerals, marked however with a prime in respect of FIG. 1 and 4 through 6.

The most significant modifications made to the mechanism of FIGS. 2 and 3 reside in the structures of the wear ring 32' and the force-transmitting wedges, generally designated by the numeral 38'. It will be noted that its forward bearing surface 84' of the ring 32' is formed with a uniform, arcuate curvature, as previously described in Nowak et al patent No. 5,269,543.

The form of the wedges 38' is unique to the present invention. As is best seen in FIG. 6, each wedge has a cylindrical central portion 88, which is disposed intermediate of arcuately tapered opposite end portions 90. The end portions merge smoothly into the central portion with no discernable ridge or break, such as would tend to score and wear the inside surface 48' of the outer housing (operating member); thus, it will be appreciated that the dotted lines distinguishing the portions are for illustrative purposes only, and do not represent a structural feature of the wedge. The circumferential edges 94 on the opposite ends of the wedges are rounded to avoid sharp edges at the intersections of the side and end surfaces. This feature affords optimal performance, while also minimizing wear and damage.

It will normally be most desirable to form the wedge member and the inside surface 48' (defining the small radius section of the operating member recess) at the same radius, so as to promote full line contact of the arcuate elements 92 thereon. The chordal element 86 of the wedge member will of course form a small gap "h" with the surface 48'.

By way of specific example, an illustrative wedge, in a mechanism comprised of ten wedges, may be about 1.10" long, formed with a radius "R" of about 2.25" and having a diameter, at its midpoint, of about 0.64". The chord length of the rectilinear line element 86 would be about 0.22", and the gap "h" (at its largest point) would be about 0.002". These values can of course wary widely, and depend most fundamentally upon the size of the mechanism involved. Functionally, the wedge contours and dimensions should be such as to produce an optimal balance between arcuate line contact of the elements 92 on the surface 48' and rectilinear line contact of the elements 86 on the face 73 of the pressure collar 24'. The chord length "c" will generally be made as long as possible, consistent with the avoidance of deformation of and damage to the operating member surfaces; typically, its value will be about 15 to 30 percent of the length of the wedge, with a value of about 20 percent being preferred in many instances.

The mechanism shown in FIGS. 4 through (6 operates in the same manner as does that which was discussed in reference to FIGS. 2 and 3. Sliding the operating sleeve 26' forwardly from the position shown in the lower half of FIG. 4 to that of the upper half, ultimately brings the small-radius inner section 48' of the compound recess to bear upon the array of wedge members 38'(having passed through the transition section 52'), forcing them to their fully inward positions. The force applied is in turn amplified by the wedge members 38', and is transmitted through the surface portions 86, 92 thereof to the confronting surfaces 73, 84' of the closing member 24' and wear ring 32', respectively, thereby effecting a forward shifting of the closing member and operating the collet in the manner described.

Thus, it can be seen that the present invention provides a novel, wedge-operated force-transmission mechanism, which is especially suitable for collet-closing applications and which affords improved force transmission, ease of operation, durability and economy of manufacture. The instant construction allows the wedge members, and all surfaces with which they coact, to be fabricated from hardened steel, thus minimizing distortion and providing an advantageous match of friction coefficients. It also affords optimal surface contact among the force-transmitting elements, coupled with smooth, effective and efficient movement.

Having thus described the invention what is claimed is:

1. A force-transmission mechanism comprising, in combination: a supporting member having a longitudinal axis; a flange portion extending circumferentially about said supporting member, coaxially with said longitudinal axis, and fixed thereon against axial movement in at least a rearward direction, said flange portion providing a generally annular forward-facing bearing surface; a pressure collar slidably mounted for limited axial movement on said supporting member and having a generally annular bearing surface disposed coaxially with said longitudinal axis in confronting relationship to said flange portion bearing surface, so as to cooperatively define therebetween an inwardly tapered circumferential channel; a multiplicity of substantially identical wedge members disposed in a circular array about said supporting member for radial movement within said channel and conforming generally thereto, each of said wedge members being of generally flatted barrel-shaped form and having a central axis disposed substantially perpendicular to said longitudinal axis of said supporting member, said each wedge member having a circular cross-sectional configuration, taken in transaxial planes to which said central axis is normal, and having a substantially convex cross-sectional configuration taken in axial planes in which said central axis lies, said each wedge member deviating from true convex form by having a cylindrical central portion which merges smoothly into end portions that taper therefrom in opposite directions, said central portion providing, in said axial planes, rectilinear line contact elements lying intermediate of arcuate line contact elements provided by said end portions; and an operating member slidably mounted for movement on said longitudinal axis relative to said supporting member, and having a sidewall portion extending over said wedge members and defining a compound circular recess therewithin, said compound recess being comprised of a relatively large radius forward section, a relatively small radius rearward section, and a transition section therebetween, said operating member being movable between a rearward, open position in which said forward section of said recess is disposed over said circumferential channel, and a forward, closed position in which said rearward section is disposed over said channel, the relatively large dimensions of said forward section of said recess permitting said wedge members to assume radially outward positions within said channel, relative to said longitudinal axis, with said operating member in said open position, and the relatively small dimensions of said rearward section forcing said wedge members to radially inward positions with said operating member in said closed position thereof, said wedge members being dimensioned to act upon said bearing surfaces of said flange portion and said pressure collar to shift said pressure collar forwardly in said closed position of said operating member.

2. The mechanism of claim 1 wherein the opposite ends of each of said wedge members are curved in said axial planes to provide blunt circumferential edges thereabout.

3. The mechanism of claim 1 wherein said central portion constitutes about 15 to 30 percent of the length of each of said wedge members.

4. The mechanism of claim 1 wherein said arcuate line contact elements of said each of said wedge members are formed at a radius that is at least substantially equal to the radius of said relatively small radius rearward section of said operating member compound recess.

5. The mechanism of claim 1 wherein said annular bearing surface of said pressure collar is flat.

6. The mechanism of claim 1 wherein said forward-facing bearing surface of said flange portion is of convex form, taken in planes extending longitudinally therethrough.

7. The mechanism of claim 1 wherein said flange portion is comprised of a back-up flange integrally formed on said supporting member, and a separate wear ring assembled therewith and providing said annular bearing surface of said flange portion.

8. The mechanism of claim 1 wherein said transition section of said compound recess in said operating member sidewall portion is of convexly arcuate cross section, taken in planes extending longitudinally therethrough.

9. The mechanism of claim 1 wherein each of said wedge members is integrally formed from a single piece of metal.

10. The mechanism of claim 9 wherein said wedge members, said bearing surface of said pressure collar, and said bearing surface of said flange portion are all formed of hardened steel.

11. The mechanism of claim 1 wherein said mechanism constitutes a collet-operating mechanism, and wherein said supporting member is a sleeve member, said pressure collar is a collet-closing member, and said operating member is a sleeve member.

* * * * *